(12) United States Patent
Selm et al.

(10) Patent No.: US 6,257,824 B1
(45) Date of Patent: Jul. 10, 2001

(54) FIN ALTERNATING AND DELIVERING APPARATUS

(75) Inventors: Gerald Joseph Selm; Kevin Bonnett Wise, both of Connersville, IN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/412,818

(22) Filed: Oct. 5, 1999

(51) Int. Cl.[7] .................................................... B25J 9/14
(52) U.S. Cl. .................. 414/754; 414/755; 414/788.5; 198/400; 198/417; 198/380
(58) Field of Search .......................... 198/400, 417, 198/380; 414/788.5, 754, 755

(56) References Cited

U.S. PATENT DOCUMENTS

| | | | |
|---|---|---|---|
| 4,172,513 | * 10/1979 | Bradstreet et al. | 198/380 |
| 4,214,656 | * 7/1980 | McDonald et al. | 196/380 |
| 4,362,234 | * 12/1982 | McDonald et al. | 198/400 |
| 4,977,998 | * 12/1990 | Middeldrop | 198/395 |
| 5,022,814 | * 6/1991 | Breda et al. | 414/799 |
| 5,404,991 | * 4/1995 | Nakamura | 198/400 |
| 5,503,515 | * 4/1996 | Moorehead | 414/755 |
| 5,713,453 | * 2/1998 | Schornhorst et al. | 198/380 |
| 5,820,335 | * 10/1998 | Croteau et al. | 414/788.3 |

FOREIGN PATENT DOCUMENTS

0458580  * 11/1991  (EP) ....................... 198/380

* cited by examiner

Primary Examiner—Joseph A. Fischetti
(74) Attorney, Agent, or Firm—Larry I. Shelton

(57) ABSTRACT

A fin alternating and delivering apparatus is provided for orientating and delivering fins emanating from a fin mill to a fin trayer for assembly into a heat exchanger. The fin alternating and delivering apparatus includes an entrance chute for receiving fins emanating from the fin mill in a horizontal position. The fin alternating and delivering apparatus also includes a sensor disposed adjacent the entrance chute to sense the fins entering the entrance chute. The fin alternating and delivering apparatus includes an air jet operatively connected to the sensor for delivering a blast of air to the fins upon sensing the fins entering the entrance chute to reorientate the fins from the horizontal position to a vertical position. The fin alternating and delivering apparatus further includes a discharge chute disposed adjacent the entrance chute for guiding the fins from the entrance chute to the fin trayer in the vertical position.

20 Claims, 3 Drawing Sheets

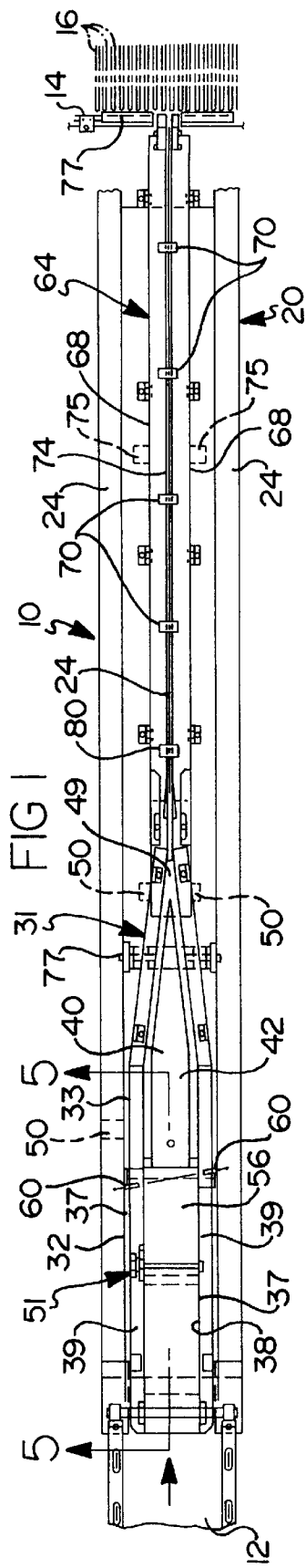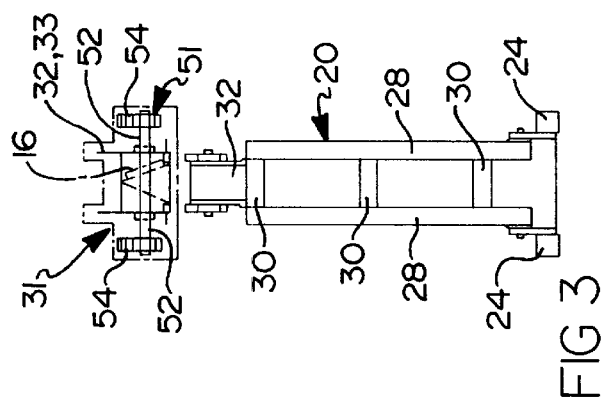

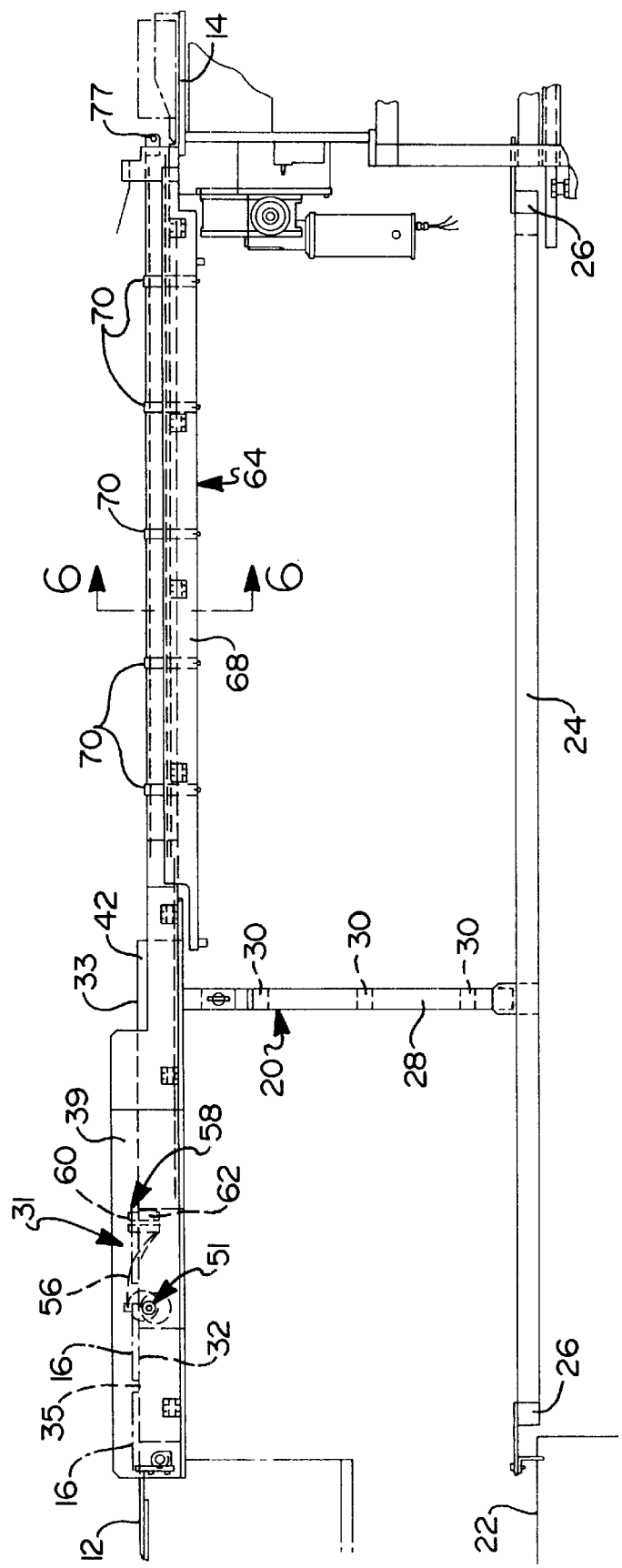

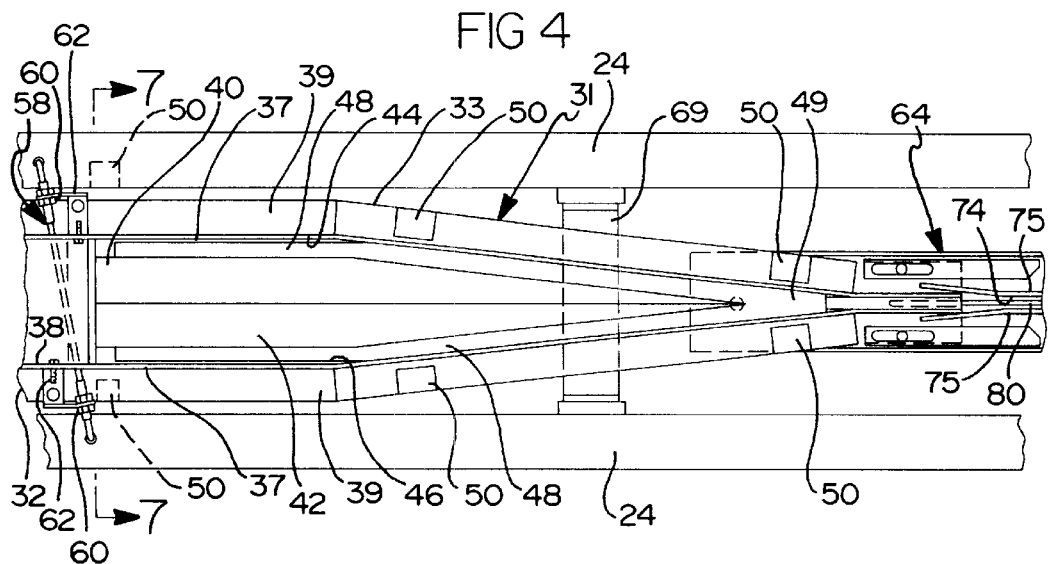
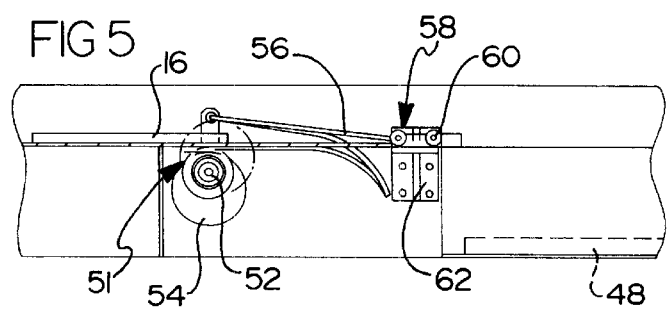
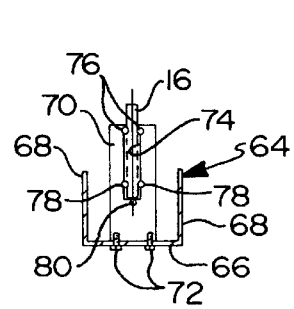 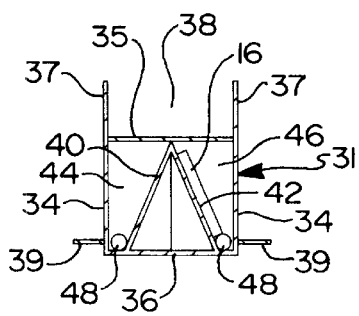

FIN ALTERNATING AND DELIVERING APPARATUS

BACKGROUND OF THE INVENTION

1. Field of the Invention

The present invention relates generally to a fin delivering apparatus and, more specifically, to a fin alternating and delivery apparatus.

2. Description of the Related Art

Fin mills produce fins for use in manufacture and assembly of a conventional fin and plate heat exchanger. The fin mill forms the fins in a corrugated manner from a flat strip or stock by alternately bending the strip in an accordion fashion, i.e., weaving the strip back and forth such that fold lines are transverse to a longitudinal axis of the fin. Each of the fins exits the fin mill in a horizontal position.

When used in the manufacture and assembly of a heat exchanger, the fin is installed in the heat exchanger in a vertical position. Thus, it is necessary to reorient the position of the fin prior to positioning it in the heat exchanger. When this process is completed manually, it results in a labor intensive and time consuming endeavor. Therefore, there is a need in the art to provide an apparatus which receives a fin emanating from a fin mill and alternatingly reorients and delivers the fin in such a manner that it may be readily assembled into a heat exchanger.

SUMMARY OF THE INVENTION

Accordingly, the present invention is a fin alternating and delivering apparatus for orientating and delivering fins from a fin mill to a fin trayer for assembly into a heat exchanger. The fin alternating and delivering apparatus includes an entrance chute receiving fins emanating from the fin mill in a horizontal position. The fin alternating and delivering apparatus also includes a sensor disposed adjacent the entrance chute to sense the fins entering the entrance chute. The fin alternating and delivering apparatus includes an air jet operatively connected to the sensor for delivering a blast of air to the fins upon sensing the fins entering the entrance chute to reorientate the fins from the horizontal position to a vertical position. The fin alternating and delivering apparatus further includes a discharge chute disposed adjacent the entrance chute for guiding the fins from the entrance chute to the fin trayer in the vertical position.

One advantage of the present invention is that a fin alternating and delivering apparatus is provided for orientating and delivering fins to be readily assembled into a heat exchanger. Another advantage of the present invention is that the fin alternating and delivering apparatus allows fins emanating from a fin mill to be alternated automatically into a fin tray to be assembled into a heat exchanger without the need for manual intervention. Yet another advantage of the present invention is that the fin alternating and delivering apparatus compensates for a tapered fin and ensures a straighter core body for the heat exchanger during brazing.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a top view of a fin alternating and delivering apparatus, according to the present invention, illustrated in operational relationship with a fin mill and a fin trayer.

FIG. 2 is a side view of the fin alternating and delivery apparatus of FIG. 1.

FIG. 3 is an end view of the fin alternating and delivery apparatus of FIG. 1.

FIG. 4 is an enlarged top view of a portion of the fin alternating and delivering apparatus of FIG. 1.

FIG. 5 is a sectional view taken along line 5—5 of FIG. 1.

FIG. 6 is a sectional view taken along line 6—6 of FIG. 2.

FIG. 7 is a sectional view taken along line 7—7 of FIG. 4.

DESCRIPTION OF THE PREFERRED EMBODIMENT(S)

Referring to the drawings, and in particular FIGS. 1 through 3, one embodiment of a fin alternating and delivering apparatus 10, according to the present invention, is illustrated in operational relationship with a fin machine or mill 12 and a fin trayer 14. The fin alternating and delivering apparatus 10 extends longitudinally between the fin mill 12 and the fin trayer 14. The fin alternating and delivering apparatus 10 receives fins 16 in a horizontal position from the fin mill 12, which are formed by the fin mill 12. The fin alternating and delivering apparatus 10 re-orientates and delivers the fins 16 in a vertical position to the fin trayer 14 for assembly into heat exchangers (not shown). Each fin 16 is accordion folded in a corrugated manner, with the fold lines occurring transverse to a longitudinal axis of the fin 16. The fins 16 are discharged from the fin mill 12 onto the fin alternating and delivering apparatus 10 by suitable means such as air from a nozzle (not shown). It should be appreciated that the fins 16, fin trayer 14 and fin mill 12 are conventional and known in the art.

The fin alternating and delivery apparatus 10 includes a support frame, generally indicated at 20, disposed between the fin mill 12 and fin trayer 14 and supported by a support surface 22. The support frame 20 includes a plurality of side members 24 extending longitudinally and a plurality of end members 26 extending laterally between the side members 24. The support frame 20 also includes a plurality of upright members 28 connected to the side members 24 by a suitable means such as welding and a plurality of brace members 30 extending laterally between the upright members 28 and connected thereto by suitable means such as welding. The members 24,26,28,30 are generally tubular and rectangular in shape.

Referring to FIGS. 1 through 7, the fin alternating and delivery apparatus 10 includes an entrance chute, generally indicated at 31, mounted on the support frame 20. The entrance chute 31 has an entrance portion 32 and an exit portion 33. The entrance portion 32 is generally rectangular in shape and hollow. The entrance portion 32 has a pair of side walls 34 spaced laterally and extending longitudinally and a top wall 35 and bottom wall 36 extending laterally and longitudinally and interconnecting the side walls 34 to form a generally square cross-sectional shape. The entrance portion 32 includes a pair of guide rails 37 extending upwardly from the side walls 34 thereof to form a path of travel or channel 38 for the fins 16 emanating from the fin mill 12. The entrance portion 32 may include flanges 39 extending laterally and longitudinally to add support to the side walls 34. It should be appreciated that the walls 34,35,36 and guide rails 37 and flanges 39 may be secured together by suitable means such as welding.

The exit portion 33 of the entrance chute 31 is constructed similar to the entrance portion 32, but eliminates the top wall 35. The exit portion 33 has a first inclined wall 40 and a second inclined wall 42 forming a generally inverted "V" shape cross-section. The first inclined wall 40 and side wall 34 form a first exit channel 44 and the second inclined wall 42 and side wall 34 form a second exit channel 46. The exit portion 33 includes a guide 48 disposed in and extending along the first exit channel 44 and second exit channel 46 to guide the fin 16 therealong. The guide 48 is generally circular in cross-sectional shape. The first exit channel 44 and second exit channel 46 extend longitudinally and laterally toward each other to a common channel 49. The fins 16 move along the exit channels 44 and 46 by blasts of air from air nozzles or jets 50. It should be appreciated that the air jets 50 are connected to a source of air and controlled by a controller (not shown).

The fin alternating and delivery apparatus 10 includes an escape mechanism, generally indicated at 51, to allow an operator to discharge the fins 16 from the entrance chute 31. The escape mechanism 51 includes a rotatable shaft 52 connected to the entrance chute 31 with an eccentric roller 54 on each end of the shaft 52. The escape mechanism 51 also includes a bail 56 extending longitudinally and pivotally connected to the shaft 52. The bail 56 rests on the top wall 35 of the entrance chute 31 and is raised and pivoted manually by an operator. When the bail 56 is raised and pivoted by the operator, the fin 16 may escape out a bottom of the entrance chute 31 into a scrap bin (not shown).

The fin alternating and delivering apparatus 10 includes a sensor switch 58 at the entrance portion 32 of the entrance chute 31. The sensor switch 58 includes at least one, preferably a pair of light sensors 60 mounted on the entrance portion 32 of the entrance chute 31. The light sensors 60 are disposed on opposed sides of the entrance portion 32 near the discharge end thereof. The light sensors 60 are connected to the side walls 34 by suitable means such as brackets 62 and electrically connected to a controller (not shown). The sensor switch 58 sends a signal to a controller (not shown) that the fin 16 is present and about to exit the entrance portion 31. When the controller receives a signal from the light sensors 60, it activates the source of air to flow to one of a pair of air jets or nozzles 50 adjacent the light sensors 60. The controller alternates blasts of air to the air jets 50 to direct every other fin 16 down the first exit channel 44 and second exit channel 46. It should be appreciated that the light sensors 60 are conventional and known in the art.

The fin alternating and delivering apparatus 10 includes a discharge chute, generally indicated at 64, extending from a discharge end or the common channel 49 of the entrance chute 31. The discharge chute 64 includes a base wall 66 extending laterally and longitudinally and side walls 68 extending upwardly from the base wall 66 to form a generally "U" shaped cross section. The discharge chute 64 includes a plurality of support brackets 70 spaced longitudinally and extending vertically and connected to the base wall 66 by suitable means such as fasteners 72. The support brackets 70 have a generally rectangular channel 74. The discharge chute 64 also includes a pair of guide plates 75 at an entrance of the channel 74 to direct the fins 16 into the channel 74.

The discharge chute 64 also includes at least one, preferably a pair of wire rods 76 and 78 on opposed sides of the channel 74 and one wire rod 80 at a bottom thereof to guide the fins 16 longitudinally along the channel 74. The discharge chute 64 includes a plurality of air nozzles or jets 75 to move the fins 16 longitudinally along the channel 74. The support brackets 70 have recesses for the wire rods 76, 78 and 80. It should be appreciated that the wire rods 76, 78 and 80 support the fins 16 in a wire cage like track.

In the disclosed embodiment, the base wall 66 has one end attached to the bottom wall 36 of the entrance chute 31 and the other end connected to the fin trayer 14 by suitable means such as fasteners (not shown). It should be appreciated that the discharge chute 64 could stand independently.

In operation, the fin mill 12 produces the corrugated fins 16 for a core (not shown) of a heat exchanger. The fins 16 are ejected from the fin mill 12 by air jets and onto the entrance chute 31 of the fin alternating and delivering apparatus 10 in horizontal position. The fins 16 activate the light sensors 60 when they enter the entrance portion 32. When the light sensors 60 are activated by the fin 16 breaking the light beam between the light sensors 60, a signal is sent to the controller. The controller, in turn, sends a signal to activate one of the air jets 50 adjacent the light sensors 60 to blast air and rotate the fins 16 into the exit portion 33. The controller alternates blasts of air to direct every other fin 16 down either the first exit channel 44 or second exit channel 46. The fins 16 are moved in an inclined position along the two exit channels 44 and 46 by blasts of air from the air jets 50 into the common chute 49 where they are moved to a vertical position upon entering the common channel 49. The fins 16 enter the discharge chute 64 and are moved by blasts of air from the air jets 75 along the wire rods 76, 78 and 80 in the vertical position into the fin trayer 14 for use in assembling heat exchangers. It should be appreciated that the fin trayer 14 is indexed to fill a tray of fins 16.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fin alternating and delivering apparatus for orientating and delivering fins emanating from a fin mill to a fin trayer for assembly into a heat exchanger comprising:

an entrance chute receiving fins emanating from the fin mill in a horizontal position, said entrance chute including a wall member having an inverted V shape to form a first exit channel and a second exit channel spaced laterally from each other;

a sensor disposed adjacent said entrance chute to sense the fins entering said entrance chute;

an air jet operatively connected to said sensor to deliver a blast of air to the fins upon sensing the fins entering said entrance chute to rotate the fins and drop the fins into said first exit channel and said second exit channel to re-orientate the fins from the horizontal position to a vertical position;

a discharge chute disposed adjacent said entrance chute for guiding the fins from said entrance chute to the fin trayer in the vertical position; and a controller electrically connected to said sensor and said air jet to activate said air jet when the fins are sensed by said sensor and to alternate the fins into said first exit channel and said second exit channel.

2. A fin alternating and delivering apparatus as set forth in claim 1 wherein said entrance chute has an entrance portion and an exit portion.

3. A fin alternating and delivering apparatus as set forth in claim 2 wherein said entrance portion includes a pair of guide plates extending outward and forming a channel.

4. A fin alternating and delivering apparatus as set forth in claim 2 wherein said exit portion includes said first exit channel and said second exit channel extending longitudinally and merging into a common channel.

5. A fin alternating and delivering apparatus as set forth in claim 1 wherein said sensor comprises at least one light sensor mounted on said entrance portion for detecting the presence of fins.

6. A fin alternating and delivering apparatus as set forth in claim 1 including a pair of opposed air jets mounted on said entrance portion to direct blasts of air in an alternating manner such that every other fin enters said first exit channel and said second exit channel.

7. A fin alternating and delivering apparatus as set forth in claim 6 wherein said entrance chute includes an escape mechanism on said entrance portion to allow an operator to manually discharge rejected fins from said entrance chute.

8. A fin alternating and delivering apparatus as set forth in claim 2 wherein said entrance portion has a bottom wall and side walls extending upwardly from said bottom wall and a top wall interconnecting said side walls and opposing said bottom wall.

9. A fin alternating and delivering apparatus as set forth in claim 2 wherein said exit portion includes a bottom wall and side walls extending upwardly from said bottom wall and said wall member comprises a first inclined wall and a second inclined wall having one end connected to said bottom wall and another end to each other to form a general inverted V shape cross-section.

10. A fin alternating and delivering apparatus for orientating and delivering fins emanating from a fin mill to a fin trayer comprising:

an entrance chute receiving fins emanating from the fin mill in a horizontal position, said entrance chute having an entrance portion and an exit portion including a wall member having an inverted V shape to form a first exit channel and a second exit channel;

a sensor disposed adjacent said entrance chute to sense the fins entering said entrance portion;

a plurality of air jets to direct blasts of air to the fins upon sensing the fins entering said entrance portion to rotate the fins and drop the fins into said first exit channel and said second exit channel in an alternating manner such that every other fin enters said first exit channel and said second exit channel to reorientate the fins from the horizontal position to a vertical position;

a discharge chute disposed adjacent said exit portion for guiding the fins from said entrance chute to a fin trayer in the vertical position; and a controller electrically connected to said sensor and said air jets to activate said air jets when the fins are sensed by said sensor and to alternately direct every other fin of the fins down either one of said first exit channel and said second exit channel.

11. A fin alternating and delivering apparatus as set forth in claim 10 wherein said entrance portion includes a pair of guide plates extending outward and forming a channel.

12. A fin alternating and delivering apparatus as set forth in claim 10 wherein said exit portion includes a common channel at an end of said first exit channel and said second exit channel.

13. A fin alternating and delivering apparatus as set forth in claim 10 including a guide disposed in said first exit channel and said second exit channel to guide the fins therealong.

14. A fin alternating and delivering apparatus as set forth in claim 10 including a support frame to support said entrance chute above a support surface.

15. A fin alternating and delivering apparatus as set forth in claim 10 wherein said sensor comprises a light sensor mounted on said entrance portion for detecting the presence of fins.

16. A fin alternating and delivering apparatus as set forth in claim 10 wherein said discharge chute includes a plurality of wire rods forming a channel extending longitudinally to guide the fins in the vertical position therealong.

17. A fin alternating and delivering apparatus as set forth in claim 16 wherein said discharge chute includes a plurality of support brackets for supporting said wire rods.

18. A fin alternating and delivering apparatus as set forth in claim 10 including an escape mechanism to allow an operator to manually discharge rejected fins from said entrance chute.

19. An apparatus as set forth in claim 10 wherein said entrance portion has a bottom wall and side walls extending upwardly from said bottom wall and a top wall interconnecting said side walls and opposing said bottom wall.

20. A fin alternating and delivering apparatus as set forth in claim 10 wherein said exit portion includes a bottom wall and side walls extending upwardly from said bottom wall and said wall member comprises a first inclined wall and a second inclined wall having one end connected to said bottom wall and another end to each other to form a general inverted V shape cross-section.

* * * * *